July 14, 1964 L. J. TRANEL 3,140,755
MUFFLER OR OTHER HOLLOW ARTICLE AND FABRICATION OF SAME
Filed April 15, 1960 3 Sheets-Sheet 1

INVENTOR.
LESTER JOSEPH TRANEL
BY
ATTORNEYS

July 14, 1964 L. J. TRANEL 3,140,755
MUFFLER OR OTHER HOLLOW ARTICLE AND FABRICATION OF SAME
Filed April 15, 1960 3 Sheets-Sheet 2
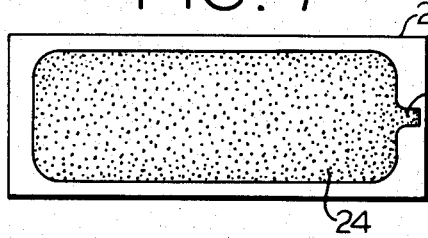
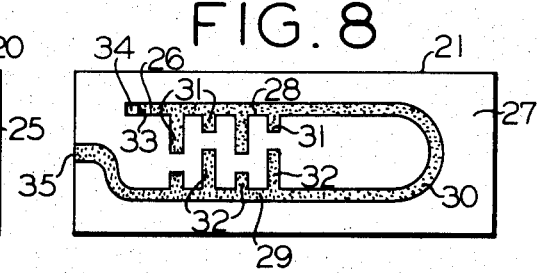
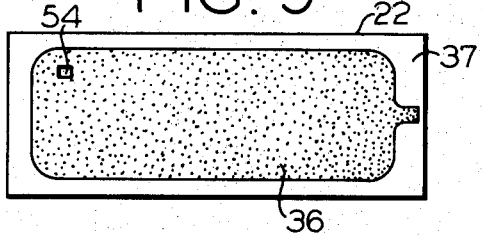
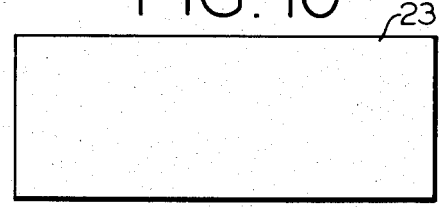
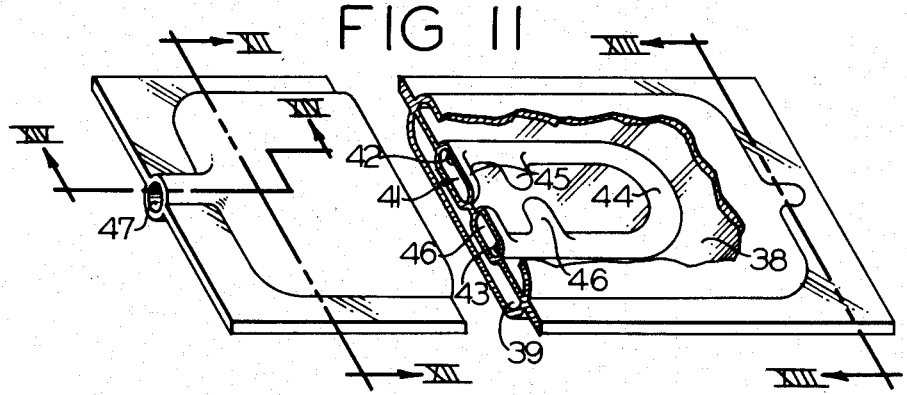
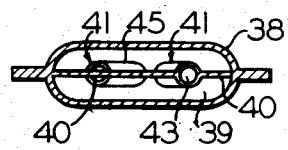
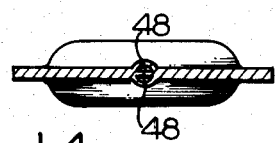
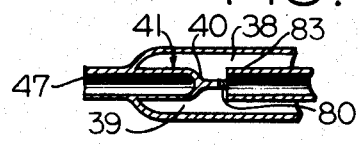
INVENTOR.
LESTER JOSEPH TRANEL
BY
ATTORNEYS

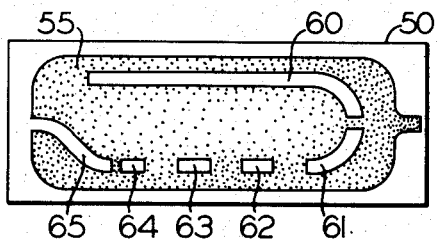
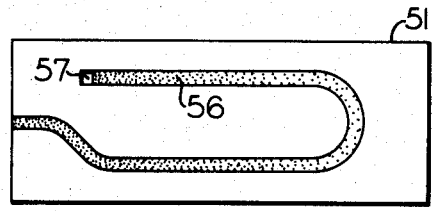
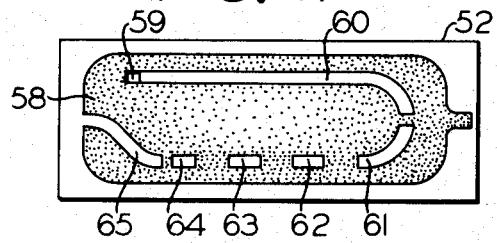
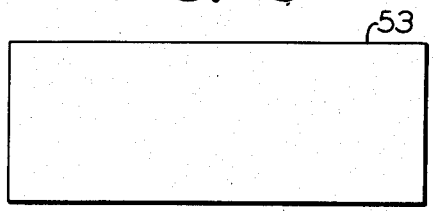
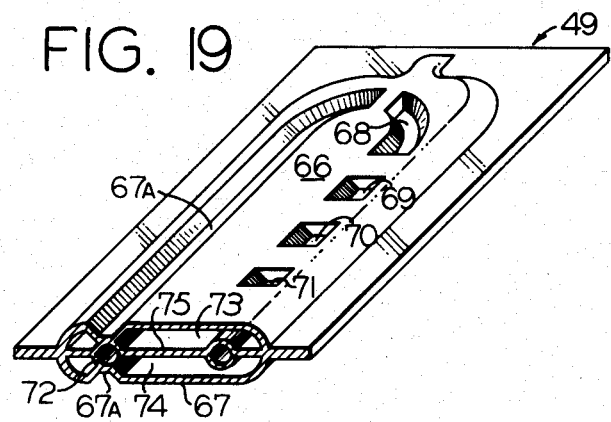

United States Patent Office 3,140,755
Patented July 14, 1964

3,140,755
MUFFLER OR OTHER HOLLOW ARTICLE AND
FABRICATION OF SAME
Lester Joseph Tranel, St. Louis, Mo., assignor to Olin Mathieson Chemical Corporation, East Alton, Ill., a corporation of Virginia
Filed Apr. 15, 1960, Ser. No. 22,441
11 Claims. (Cl. 181—61)

This invention relates to hollow articles and more particularly to seamless hollow pulsation dampening articles adapted for use as surge absorption devices, acoustical mufflers and the like.

Accordingly, it is an object of this invention to provide new and improved pulsation dampening devices and a novel method for making them.

Another object of this invention is to provide a new pulsation dampening device of simplified and improved construction and a novel method for making them.

Other objects and advantages will become more apparent from the following description and drawings in which:

FIGURES 7 to 10 illustrate a plurality of sheets having appropriate coating of stop-weld material thereon and for superimposition upon one another to form another embodiment of this invention;

FIGURE 11 is a perspective view on an enlarged scale, broken open to reveal internal structure, illustrating the embodiment of this invention obtained by the unification of the sheets illustrated in FIGURES 7 to 10;

FIGURES 12, 13 and 14 are sectional views on a reduced scale taken along lines XII—XII, XIII—XIII and XIV—XIV, respectively, of FIGURE 11;

FIGURES 15 to 18 are plan views of a plurality of component sheets appropriately coated with a pattern of stop-weld material employed for fabricating still another embodiment of this invention; and FIGURE 19 is a partial perspective view in section on an enlarged scale illustrating the embodiment of this invention by use of the component sheets of FIGURES 15 to 18.

Figure 1:
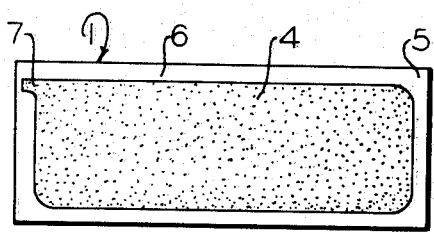
FIGURES 1 to 3 are plan views of a plurality of component sheets with appropriate coating of stop-weld material on them employed in fabricating one embodiment of this invention.

In accordance with this invention there is provided a hollow structure comprised of a seamless body of metal containing at least one cavity or chamber, defined and contained between opposed walls of which one wall contains an internally disposed system of tubular passages having a terminal end communicating with the cavity or chamber. In the embodiments containing a single cavity or chamber defined between two opposing walls, the system of passageways is internally contained and disposed within one of the walls and communicates with the chamber. In the embodiments containing more than one chamber between a pair of external walls the plurality of chambers are formed by interposition of an internal wall preferably coextensive with the external walls which subdivide the chamber into two smaller chambers. This inner wall is adapted in accordance with this invention to internally contain a pattern of passageways communicating with one or both of the smaller chambers. This invention can be subject to various modifications. In one example, the hollow articles may be reinforced by unification of one or more portions of the outer wall of the article to and at corresponding portions of the wall in which the internal system of passageways is disposed. In another modification adapting the article for use as an acoustic muffler, a system of passageways contained within one of the walls is provided with one or more spur-tubes of equal or different lengths branching away from the main passages and terminating within the confines of the wall in which they are disposed with the specific number and sizes of these spur-tubes dictated by the conditions under which the muffler is to operate so as to control and adjust for the resonance of the muffler as required.

A method by which the invention and the above modified embodiments are accomplished contemplates selectively joining the adjacent surfaces of a sufficient number of superimposed component sheets in a predetermined pattern in a manner which comprises selective unification of the adjacent surfaces of a first pair of component sheets to define between them a desired system of internal tubular passageways having a terminal end adapted for connection externally of the ultimate unit and another terminal end adapted to communicate with an internal cavity or chamber formed between the aforesaid first pair of component sheets and an outer or third component sheet disposed adjacent and selectively unified to at least one outer face of the aforesaid first pair of component sheets. The internal cavity or chamber is preferably of larger volumetric capacity than the system of passageways provided between the first pair of component sheets. One known method by which the unification of the sheets is accomplished as by pressure welding in accordance with the procedure more fully disclosed in U.S. Patent No. 2,690,002, issued September 28, 1954, to L. H. Grenell and employed in describing the embodiments of this invention.

In accordance with the above referred-to U.S. No. 2,690,002 and referring to FIGURES 1 to 6, one embodiment of this invention is obtained from three component sheets 1, 2, and 3 of which two sheets have specifically defined patterns of stop-weld material coated on their surface with the remaining portions of all the adjacent surfaces of the superimposed sheets having their surfaces suitably prepared for unification in accordance with the aforesaid U.S. patent to Grenell. In accordance therewith a substantially solid pattern of stop-weld material 4 is applied to one surface 5 of component sheet 1 so as to cover substantially the entire area of this surface except for a peripheral marginal portion 6 extending around this pattern. In order to adapt this pattern for connection externally of the ultimate article a strip of stop-weld material 7 extends from the pattern 4 to a point short of an edge of sheet 1 in order to form a convenient means into which a port or opening ultimately can be made. Either prior to or after superimposition of sheet 2 on sheet 1 to sandwich the pattern of stop-weld material 4 between them a surface 8 on sheet 2 has applied to it a pattern, or coating, 9 of stop-weld material to define a desired system of passageways. In order to adapt the system of passageways, defined by pattern 9 for intercommunication with the unjoined portion between sheets 1 and 2, defined by the pattern of stop-weld material 4 on sheet 1, an appropriate opening 10 such as a slit or slot, or any other convenient perforation obtained by punching, blanking and the like, is provided through sheet 2 either through a terminal end of the pattern defining a system of passageways 9 or in a portion of sheet 2 to place it in communicating relationship with patterns 4 and 9 of stop-weld material applied on sheets 1 and 2, respectively. Such a location of the opening 10 on sheet 2 is essential in order that the ultimate system of passageways will be in communicating relationship with this opening.

As will be observed, it is necessary that the pattern 9 of stop-weld material defining the desired system of passageways be disposed on the surface of sheet 2 which will be externally disposed after superimposition of this component sheet on sheet 1. After the superimposition of sheet 2 on sheet 1 the third component sheet 3 is then superimposed on sheet 2 so as to sandwich between them the pattern 9 of stop-weld material. Although not required the surface of sheet 3 which will be adjacent the surface 8 of sheet 2 on which the pattern of stop-weld material 9 has been applied may also have a pattern of stop-weld material applied in a manner so that this pattern will be a mirror image of pattern 9, and applied in the portions of sheet 3 which will coincide to and register with the corresponding portions of surface 8 of sheet 2 to which the pattern 4 of stop-weld was applied. After the assembly of the sheets by superimposition upon each other to form a pack 12, they are tacked together, as by spot-welds 11 at each corner, to prevent relative slippage of the adjacent surfaces of the sheets 1, 2 and 3 during a subsequent welding operation. Any suitable weld-inhibiting material may be employed to prevent unification of the adjacent surfaces of the sheets and the portions therebetween coated with the stop-weld material during the welding operation, for example graphite in water glass.

Figure 2:
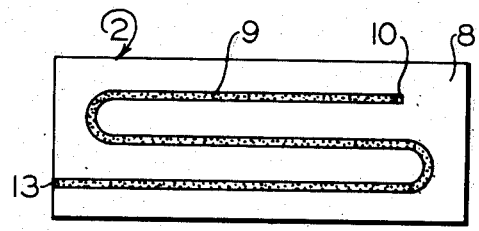
Figure 3:
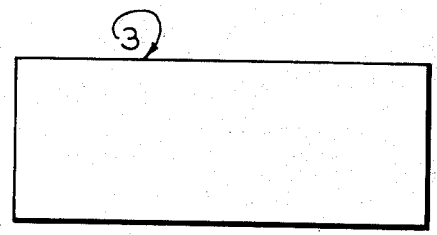
Figure 4:
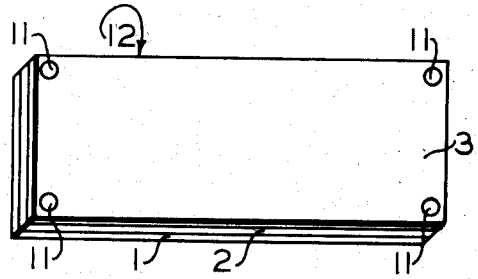
FIGURE 4 is a perspective view showing the sheets of the preceding figures in superposed relationship in accordance with this invention.

As illustrated in FIGURE 2, terminal end 13 of the pattern 9 of stop-weld material is shown as terminating at the edge of sheet 2. As will be understood the terminal end 13 of pattern 9 may also terminate inwardly of sheet 2 while the elongated strip 7 of pattern 4 terminates at an edge of sheet 1. Since the patterns 4 and 9 of stop-weld material are in intercommunication with each other through the perforation 10 in sheet 2, termination of one of the patterns at an edge of the sheet provides ready access for fluid pressures in subsequent inflation of this embodiment into the desired structure. As will be understood, if desired, both patterns may terminate inwardly of all edges of the sheet to which they are applied, and an opening may be provided after a subseqnent welding operation by trimming the subsequent welded sheets in a manner which exposes either the strip of stop-weld material 7 extending from pattern 4 or the terminal end 13 of pattern 9.

After the assembly of sheets has been tacked together, against relative movement, they are welded at their adjacent surfaces not separated by the stop-weld material in any conventional manner. One well known method of welding the sheets is by hot rolling, in accordance with the aforesaid U.S. patent to Grenell, in which the sheets are first heated and then passsed through conventional mill rolls which weld the sheets together and simultaneously reduce them in thickness and elongation in the direction of rolling. The resultant blank is an integrally unified and seamless structure having internally disposed therein an unjoined portion corresponding to the patterns of weld-inhibiting material employed between each pair of adjacent superimposed sheets, with the pattern 9 of stop-weld material overlying the pattern 4 of stop-weld material and separated therefrom by an internal portion of the resultant pressure welded blank formed from component sheet 2.

If desired the resultant pressure welded blank having the unjoined interior portions corresponding to the patterns of stop-weld material employed may be softened in any appropriate manner as by annealing, and thereafter the blank may be cold rolled to final gauge and/or to provide a more even thickness and again annealed to facilitate the blank for expansion. This process of fabricating a blank having an unjoined interior portion is fully described in the aforementioned patent to Grenell.

After the welding operation the resultant integral and seamless blank has the exposed portion of the pattern 9 of stop-weld material defined by terminal end 13 forced open, a suitable nozzle is inserted into the resultant orifice and the blank is then expanded by injecting into the internally unjoined portions of the blank a fluid pressure of sufficient magnitude to permanently expand the blank into the desired structural configuration. The expansion of the blank may be accomplished by any convenient method as for example, the blank may be expanded freely with the blank unconfined, in which case the expanded blank will have an arcuate cross-section, or the blank may be expanded between flat surfaces of spaced apart platens so that both external walls of the blank will be expanded into a flat-topped structure. To obtain the embodiment illustrated in FIGURE 5 the blank resulting from the unification of the component sheet by pressure welding may be placed on a rigid surface and a suitable restraining pressure against expansion, such as a rubber pad or a hydraulic fluid, exerted on the opposite side of the blank simultaneously with the injection of the fluid pressure internally of the blank, as for example, by means similar to that disclosed in U.S. Patent No. 2,866,429.

Figure 5:
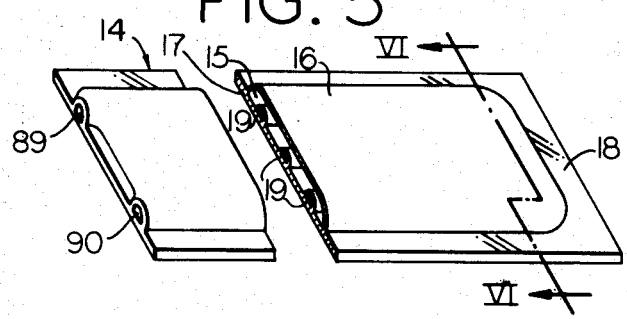
FIGURE 5 is a perspective view on an enlarged scale, broken open to reveal internal structure, illustrating one embodiment of this invention obtained by the unification of the sheets of the preceding figures, the device being shown in an inverted position.
Figure 6:
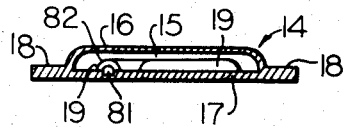
FIGURE 6 is a sectional view taken along line VI—VI of FIGURE 5.

As illustrated in FIGURE 5 such an expansion results in an expanded hollow article 14 which is expanded on only one side, as for example, on the side defined by the portion thereof formed of component sheet 1 with the other side of the hollow article 14 remaining substantially flat and unexpanded. As illustrated in FIGURES 5 and 6 the hollow article 14 is a seamless hollow structure comprising a seamless metal sheet having an expanded cavity 15 disposed internally within it and defined between external walls 16 and 17 and peripherally sealed within seamless portions of the sheet which form a radially extending seamless extension or flange 18 of the outer walls of the cavity circumscribing the cavity or chamber 15. As will be understood the internal cavity 15 results by the interposition of the pattern 4 of stop-weld material between sheets 1 and 2 and has a configuration corresponding to this pattern of stop-weld material. The hollow article 14 also contains a separate and distinct system of tubular passages 19 disposed internally within one wall 17 of the two outer walls defining cavity 15 within article 14. This wall 17 results from the unification, by pressure welding, of the adjacent surfaces of sheets 2 and 3 not separated by stop-weld material to contain the system of tubular passageways 19 between them. The system of passageways 19 is in intercommunicating relationship with expanded cavity 15 by the expanded terminal end portion 10, of pattern of stop-weld material 9 as a result of its termination into the opening 10, provided in sheet 2. The provision of perforation 10 in sheet 2 prevents the terminal end 82 of tubular passages 19 from being sealed between the unified sheets 2 and 3, thus leaving this terminal end open forming an opening 81 for communication with the expanded chamber 15.

After expansion, the article 14 may be further trimmed in the portions of it to expose the expanded portions within it corresponding to the strip of stop-weld material 7 extending from pattern 4 to form an additional port or orifice 90 for connection externally of the hollow article 14. When employed as a pulsation dampening device, high pressure gases may be directed into the externally communicating end 89 of the system of tubular passages 19 through which the gases pass to be exited at the other open terminal end 82 of passages 19 into the expanded internal chamber 15 in which they are expanded and contained until they are exhausted through the port or orifice 90 made into the portion of the expanded chamber 15 corresponding to the strip of stop-weld material 7 extending from pattern 4. Due to the relatively larger volumetric capacity of expanded cavity 15 pulsations and fluctuations of the gases being injected and passed through patterns 14 are readily absorbed and dampened.

In another embodiment of this invention a hollow structure may be obtained in which an expanded chamber or cavity is provided on both sides of a unified pair of component sheets so as to contain an internally disposed system of tubular passages. This embodiment is formed of four component sheets 20, 21, 22 and 23 successively superimposed upon each other with appropriate patterns of stop-weld material interposed between adjacent sheets. In this embodiment component sheet 20 has a substantially solid pattern 24 of stop-weld material coated on a surface of it to substantially cover the major portion of this surface in substantially the same manner as the surface of sheet 1 in FIGURE 1. In order to adapt the ultimate structure for connection externally of it the pattern 24 of stop-weld material is extended in a strip 25 toward but short of an edge of sheet 20. Component sheet 21 which is to be superimposed on sheet 20 to sandwich pattern 24 between them has a pattern 26 of stop-weld material applied on the surface 27 of the pair of sheets which will be exposed for superimposition upon them of sheet 22.

Pattern 26 of stop-weld material defines the system of passageways desired in this embodiment and comprises strips 28 and 29, corresponding to the segments of passageways desired in the ultimate article, interconnected by a semicircle strip 30 corresponding to the tubular return bend desired to connect to these passageway segments. In addition, pattern 26 also comprises a plurality of bands or strips 31 and 32 of stop-weld material of varying and different lengths branching away from strips 28 and 29, respectively, of stop-weld material to define the desired number and configuration closed-end spur-tubes branching away from their respective tubular segments. As with the preceding embodiment of the pattern 26 of stop-weld material communicates at one terminal end 33 with a perforation 34 provided through sheet 21 whereas its other terminal end 35 is extended and terminated to an edge of sheet 21 opposite the edge of sheet 20 to which strip 25 of stop-weld material extends. These spur-tubes form resonating tubes to provide greater muffling when the structure of this embodiment is employed as an acoustic muffler and the specific number and configuration of spur-tubes desired and specific pattern of strip of stop-weld material to define these spur-tubes is adjusted to the resonance of the muffler as required in a manner well known in the art.

The third sheet 22 having a pattern 36 of stop-weld material applied to a surface 37 similar to pattern 24 applied on sheet 20 is superimposed on sheet 27 to form a three layer pack of component sheets so that surface 37 of sheet 22 forms the external face of the three layer pack. As shown the superimposition of sheet 22 on component sheet 21 sandwiches pattern 36 between them. In addition, in order to provide a means of intercommunication between pattern 36 of stop-weld material, applied on component sheet 22, and pattern 26 which defines the desired system of tubular passageways between unified sheets 21 and 22, sheet 22 has a perforation 54 extending through it in a portion of the sheet so that perforation 54 will register with perforation 34 through sheeet 21 and be in communicating relationship with patterns 26 and 36 of stop-weld material. Although not necessary nor required, both of these perforations, if desired, may have their walls suitably coated with stop-weld material or the perforations may be filled with stop-weld material to further insure against the possibility of their sealing during the unification of the component sheets.

In like manner component sheet 23 is then superimposed on sheet 22 to sandwich pattern 36 between these two sheets. As will be understood a pattern 24 of stop-weld material applied on sheet 20 and a pattern 36 of stop-weld material applied on sheet 22 define the desired expanded cavities or chambers to be contained internally within the resultant structure of this embodiment. These expanded cavities and their corresponding patterns of stop-weld material may be similar to each other, identical or each may be of different configurations depending on the specific application desired for the structure of this embodiment.

After all the aforesaid sheets have been superimposed upon each other, their adjacent surfaces not separated by the stop-weld material are then unified or joined together by any conventional method, as for example by pressure welding as in the preceding embodiment, and expanded freely or between rigid platens. The resultant expanded structure depicted in FIGURE 11 illustrates the arcuate type of cross-sectional configuration obtained by expanding the instant embodiment freely with fluid pressure. As shown in FIGURE 11 the expanded structure contains two cavities 39 and 38, corresponding respectively to patterns 24 and 36 of stop-weld material, and separated by an internal wall or web 40 having internally disposed therein a system of tubular passageways 41 corresponding to the pattern 26 of stop-weld material applied on the surface of sheet 21. This tubular section comprises tubular segments 42 and 43 interconnected by return bend 44 corresponding to their respective portions of pattern 26 of stop-weld material applied to surface 27 of component sheet 21. In addition, branching from tubular segments 42 and 43 are the closed end spur-tubes 45 and 46. The system of passageways 41 communicates externally of the expanded structure of FIGURE 11 by means of an orifice or port 47 formed by forcing open the unjoined portion at the edge of the sheet corresponding to the terminal edge 35 of pattern 26 of stop-weld material. The other terminal end 83 of the tubular passages 41 remains open due to the register of perforations 34 and 54 provided, respectively, in sheets 21 and 22 which also leave an intercommunicating pass through an opening 80 between expanded chambers 38 and 39.

A similar orifice or port 48 into the expanded cavities, or chambers, 38 and 39 can be formed by trimming along lines XIII—XIII to expose the elongated tubular portion corresponding to the strip 25 of stop-weld material extending from the main pattern 24. This opening will be subdivided by portions of the internal wall or web 40 to in effect provide individual openings into each of expanded cavities or chambers 38 and 39.

A still further embodiment 49 integrally reinforced is illustrated in FIGURE 19 which is similar to the embodiment of FIGURE 11 but devoid of the closed-end spur-tubes branching away from the tubular passageways. This integral reinforced embodiment 49, as with the preceding embodiment, is fabricated by sandwiching a pattern 55 of stop-weld material between component sheets 50 and 51. This pattern 55 is similar to pattern 24 of FIGURE 7 except that pattern 55 is devoid of stop-weld material throughout and at portions of it which are to be positioned and unified with corresponding portions of component sheet 51 opposite and adjacent a pattern 56 of stop-weld material applied on an external face of component sheet 51. These areas, in the pattern 55 of stop-weld material, devoid of such material may be a continuous portion coextensive with the pattern 56 of stop-weld material defining the desired system of tubular passageways, or these areas may be spaced islands 60, 61, 62, 63, 64 and 65 so as to unite, during subsequent unification, only portions of component sheet 50, within pattern 55, to corresponding portions of component sheet 51 opposite and adjacent the pattern 56 of stop-weld material applied on component sheet 51.

Pattern 56, in turn, is similar to pattern 26 of FIGURE 8 with the exception of the elimination of the bands of stop-weld material defining the spur-tubes of the preceding embodiment. As with the preceding embodiment, pattern 56 of stop-weld material has a terminal end terminating in communicating relationship with a perforation 57 extending through component sheet 51 in order to provide intercommunication between the unjoined portions obtained in a subsequent operation of unifying the various component sheets. A third component sheet 52 having a pattern 58 of stop-weld material, duplicating the pattern 55 on component sheet 50, is superimposed on component sheet 51 so as to sandwich the pattern 56 of stop-weld material between these adjacent sheets and so as to dispose pattern 58 of stop-weld material externally of this three layer pack. As will be noted component sheet 52 in addition has a perforation 59 extending through it in the portion thereof which will register with perforation 57 in component sheet 51 and to place the pattern 56 of stop-weld material into communicating relationship with the pattern 58 of stop-weld material. Although not required, perforation 59 through component sheet 52 is disposed at the end and in communicating relationship with the island or area 60 free of stop-weld material. However, it is to be understood that perforation 59 can be spaced from the end of island 60 which, if desired, may be further subdivided into a plurality of individually spaced islands similar to islands 62, 63 and 64.

Superimposition of component sheet 53 on component sheet 52 completes the pack assembly of component sheets for this embodiment of 49 of FIGURE 19, which pack assembly may be then unified together in the adjacent areas between component sheets not separated by stop-weld material by conventional methods as by pressure welding discussed above in reference to the preceding embodiments. Subsequent to the unification the assembly is then expanded by injecting within the unjoined portions of this embodiment a fluid pressure of sufficient magnitude to expand the unjoined area into the desired cross-sectional configuration as illustrated in the embodiment 49 of FIGURE 19.

This embodiment 49 differs from preceding embodiments in that the external walls 66 and 67 are connected, as at 67A, 68, 69, 70 and 71, to portions of the walls of the tubular passages 72 corresponding to the patterns 55 and 58 of stop-weld material sandwiched between component sheets 50 and 51, and 52 and 53 respectively. Such unification integrally reinforces the structure while at the same time provides a plurality of openings or unjoined areas between the unified portions, for example 70 and 71, so as to leave cross-over spaces between portions of each of expanded chambers 73 and 74, defined and contained within, respectively, the external wall 66 and internal wall 75, and external wall 67 and internal wall 75.

It is to be understood that other modifications and other embodiments may be made within the scope of applicant's invention. For example, additional modifications may be made or the various features of the embodiments discussed in full above may be combined in various manners. For example, the embodiment of FIG. 19 may be modified so that tubular passages 72 may be provided with closed end branched spur-tubes terminating within the confines of the inner wall 75, and/or the embodiment 49 of FIGURE 19 may be also modified so that one or both of the external walls 66 and 67 may also have internally disposed therein an additional system of tubular passageways communicating with the expanded cavity or chamber between the external wall and the internal wall 75. Thus, although the invention has been described with reference to specific embodiments and details, various modifications and changes, within the scope of this invention, will be apparent to one skilled in the art, and are contemplated to be embraced within the invention.

What is claimed is:
1. A seamless hollow structure comprising:
  (A) a seamless metal sheet having opposed faces,
    (1) said sheet having a portion of the thickness thereof bulged outwardly beyond at least one of said opposing faces over a major portion of the area of said sheet thereby defining a pair of opposed spaced apart walls extending over said major area portion,
    (2) said sheet further having an integral, seamless, peripherally extending flange portion surrounding said bulged portion whereby said sheet defines, between said walls, an expanded chamber disposed internally within said sheet and peripherally sealed therein,
    (3) said portion of the thickness of said sheet being correspondingly bulged outwardly across said flange portion and forming an extension of said spaced apart walls thereby defining a first opening through said sheet adjacent the marginal edge thereof and extending into said chamber to provide a port in communicating relationship externally of said sheet,
    (4) said sheet having other opposed portions of its thickness bulged outwardly over an elongated tortuous path to define a system of continuous tubular passageways disposed and extending internally within said other portions of said sheet,
      (a) said system of passageways having an opening in a first terminal end thereof to place said system of passageways in communicating relationship with said chamber,
    (5) a portion of the thickness of said sheet being bulged outwardly across said flange portion thereby forming a second terminal end of said system of passageways which is disposed internally within said flange portion and in sealed relationship with said chamber, and defining a second opening adjacent the marginal edge of said sheet to place said system of passageways in communicating relationship externally of said sheet.

2. The article of claim 1 wherein said system of passageways includes at least one closed-end spur-tube branching away from said system of passageways and terminating within the confines of said sheet.

3. The article of claim 1 wherein said system of passageways comprises at least two straight tubular segments interconnected to each other by tubular return bends.

4. The article of claim 1 wherein said second spaced apart walls are further seamlessly integrated at spaced points to said opposed portions of said sheet which define said system of passageways.

5. A seamless hollow structure comprising:
  (A) a seamless metal sheet having opposed faces,
    (1) said sheet having a portion of the thickness thereof bulged outwardly beyond at least one of said opposing faces over a major portion of the area of said sheet thereby defining a pair of opposed spaced apart walls extending over said major area portion,
    (2) said sheet further having an integral, seamless, peripherally extending flange portion surrounding said bulged portion whereby said sheet defines, between said walls, an expanded chamber disposed internally within said sheet and peripherally sealed therein,
    (3) said portion of the thickness of said sheet being correspondingly bulged outwardly across said flange portion and forming an extension of said spaced apart walls thereby defining a first opening through said sheet adjacent the marginal edge thereof and extending into said chamber to provide a port in communicating relationship externally of said sheet,
    (4) at least one of said spaced apart walls having opposed portions of its thickness bulged outwardly over an elongated tortuous path to define a system of continuous tubular passageways disposed and extending internally within said one of said spaced apart walls,
      (a) said system of passageways having an opening in a first terminal end thereof to place said system of passageways in communicating relationship with said chamber, (5) a portion of the thickness of said sheet being bulged outwardly across said flange portion thereby forming a second terminal end of said system of passageways which is disposed internally within said flange portion and in sealed relationship with said chamber, and defining a second opening adjacent the marginal edge of said sheet to place said system of passageways in communicating relationship externally of said sheet.

6. The article of claim 5 wherein said system of passageways includes at least one closed-end spur-tube branching away from said system of passageways and terminating within the confines of said one of said spaced apart walls.

7. The article of claim 5 wherein said system of passageways comprises at least two straight tubular segments interconnected to each other by tubular return bends.

8. A seamless hollow structure comprising:

(A) a seamless metal sheet having opposed faces, (1) said sheet having opposed portions of the thickness thereof bulged outwardly beyond said opposing faces over a major portion of the area of said sheet thereby defining a pair of opposed spaced apart walls extending over said major area portion, (2) said sheet further having an integral, seamless, peripherally extending flange portion surrounding said bulged portion whereby said sheet defines, between said walls, an expanded chamber disposed internally within said sheet and peripherally sealed therein, (3) said portions of the thickness of said sheet being correspondingly bulged outwardly across said flange portion and forming an extension of said spaced apart walls thereby defining a first opening through said sheet adjacent the marginal edge thereof and extending into said chamber to provide a port in communicating relationship externally of said sheet, (4) a seamless web integrally united with said peripheral flange portion and extending through said chamber to subdivide said chamber into two smaller chambers each defined by said web and said spaced apart walls respectively, (a) said web having opposed portions of its thickness bulged outwardly over an elongated tortuous path to define a system of continuous tubular passageways disposed and extending internally within said web, (b) said system of passageways having an opening in a first terminal end thereof to place said system of passageways in communicating relationship with said chamber on each side of said web, (5) portions of the thickness of said sheet being bulged outwardly across said flange portion thereby forming a second terminal end of said system of passageways which is disposed internally within said flange portion and in sealed relationship with said chamber, and defining a second opening adjacent the marginal edge of said sheet to place said system of passageways in communicating relationship externally of said sheet.

9. The article of claim 8 wherein said system of passageways includes at least one closed-end spur-tube branching away from said system of passageways and terminating within the confines of said web.

10. The article of claim 8 wherein said system of passageways comprises at least two straight tubular segments interconnected to each other by tubular return bends.

11. The article of claim 8 wherein portions of said spaced apart walls are further seamlessly integrated at spaced points to portions of said web opposite said system of passageways.

References Cited in the file of this patent

UNITED STATES PATENTS

| | | |
|---|---|---|
| 1,426,352 | Brush | Aug. 22, 1922 |
| 2,150,768 | Hedrick | Mar. 14, 1939 |
| 2,297,046 | Bourne | Sept. 29, 1942 |
| 2,631,614 | Stephens | Mar. 17, 1953 |
| 2,662,273 | Long | Dec. 15, 1953 |
| 2,690,002 | Grenell | Sept. 28, 1954 |
| 2,740,188 | Simmons | Apr. 3, 1956 |
| 2,866,429 | Staples | Dec. 30, 1958 |
| 2,906,006 | Neel | Sept. 29, 1959 |
| 3,003,578 | Ewashuk | Oct. 10, 1961 |
| 3,012,309 | Meissner | Dec. 12, 1961 |

FOREIGN PATENTS

| | | |
|---|---|---|
| 604,225 | Canada | Aug. 30, 1960 |
| 632,013 | Great Britain | Nov. 15, 1949 |

UNITED STATES PATENT OFFICE
CERTIFICATE OF CORRECTION

Patent No. 3,140,755

July 14, 1964

Lester Joseph Tranel

It is hereby certified that error appears in the above numbered patent requiring correction and that the said Letters Patent should read as corrected below.

Column 3, lines 42 and 43, for "subseqnent" read -- subsequent --; column 5, line 32, strike out "of"; column 8, line 41, strike out "second".

Signed and sealed this 20th day of April 1965.

(SEAL)
Attest:

ERNEST W. SWIDER
Attesting Officer

EDWARD J. BRENNER
Commissioner of Patents